(12) United States Patent
Tian et al.

(10) Patent No.: US 11,493,355 B2
(45) Date of Patent: Nov. 8, 2022

(54) ADAPTIVE LIVE TRIP PREDICTION SOLUTION

(71) Applicant: Bayerische Motoren Werke Aktiengesellschaft, Munich (DE)

(72) Inventors: Jilei Tian, Chicago, IL (US); Longsheng Qian, Lanzhou (CN); Yang Cao, Chicago, IL (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 248 days.

(21) Appl. No.: 16/411,317

(22) Filed: May 14, 2019

(65) Prior Publication Data

US 2020/0363227 A1    Nov. 19, 2020

(51) Int. Cl.
| | |
|---|---|
| *G01C 21/36* | (2006.01) |
| *G06N 20/00* | (2019.01) |
| *G06N 5/04* | (2006.01) |

(52) U.S. Cl.
CPC ......... *G01C 21/3617* (2013.01); *G06N 5/046* (2013.01); *G06N 20/00* (2019.01)

(58) Field of Classification Search
CPC .............................. G06N 20/00; G06N 5/046
See application file for complete search history.

(56) References Cited

U.S. PATENT DOCUMENTS

| | | | | |
|---|---|---|---|---|
| 7,487,017 | B1* | 2/2009 | Bell ................. | G01C 21/3617 342/357.31 |
| 8,024,112 | B2* | 9/2011 | Krumm ............... | G01C 21/34 701/423 |
| 9,285,235 | B2* | 3/2016 | Ide ..................... | G01C 21/3617 |
| 2002/0161517 | A1* | 10/2002 | Yano ................... | G01C 21/3407 340/990 |
| 2005/0228553 | A1* | 10/2005 | Tryon ................. | B60W 10/26 701/22 |
| 2006/0238409 | A1* | 10/2006 | Yoshioka ............ | G01C 21/26 342/126 |
| 2011/0238289 | A1* | 9/2011 | Lehmann ........... | G01C 21/3617 701/533 |
| 2011/0282571 | A1* | 11/2011 | Krumm ............... | H04W 4/024 701/532 |

(Continued)

*Primary Examiner* — James J Lee
*Assistant Examiner* — Wenyuan Yang
(74) *Attorney, Agent, or Firm* — Crowell & Moring LLP (57) ABSTRACT

A system, method, and non-transitory computer-readable medium are provided for implementing adaptive live trip prediction in a vehicle of a user in real-time while the user uses the vehicle. In addition to predicting trip destinations based on historical trip data, the system uses a confidence measure of each of a plurality of known candidate destinations and a rejection strategy for rejecting candidate destinations as possible destinations based on real-time vehicle location information. When the system rejects all of the known candidate destinations and determines that the user's destination is an unknown or new destination, the system determines the location of the new destination be repeatedly determining an angle between a line from the original location to the current location and a north direction over time until the new destination can be accurately predicted. Further, the system is able to self-optimize the prediction performance without an explicit interaction with the user.

12 Claims, 12 Drawing Sheets

(56) References Cited

U.S. PATENT DOCUMENTS

| | | | |
|---|---|---|---|
| 2013/0166096 A1* | 6/2013 | Jotanovic | G01C 21/3617 |
| | | | 701/1 |
| 2014/0278051 A1* | 9/2014 | McGavran | G06N 20/00 |
| | | | 701/400 |
| 2015/0291145 A1* | 10/2015 | Yu | B60W 20/12 |
| | | | 701/22 |
| 2016/0109243 A1* | 4/2016 | Tseng | G01C 21/3484 |
| | | | 701/408 |
| 2016/0180232 A1* | 6/2016 | Tsubouchi | G06N 20/00 |
| | | | 706/48 |
| 2018/0290646 A1* | 10/2018 | Graf | B60W 20/12 |

* cited by examiner

An example of change of distance to destinations

ADAPTIVE LIVE TRIP PREDICTION SOLUTION

BACKGROUND AND SUMMARY OF THE INVENTION

The present invention relates to a system, method, and non-transitory computer-readable medium for providing adaptive live trip prediction information to a user of a vehicle in real-time while the user is using the vehicle. The adaptive live trip prediction information can also be provided to a vehicle control system in the vehicle to optimize engine efficiency and/or to optimize switching between a combustion engine and an electric engine in a hybrid vehicle.

In conventional trip prediction systems, the system is able to provide prediction information to the user of the vehicle that is based on historical data of the user's previous trips. The prediction can be learned from the user's behavior data, but it is learned offline without considering live trip data. However, in cases in which the user does not exactly follow the expected behavior, e.g., a commute in which the user drives from home to work at 7:00 AM, conventional systems have a limited ability to predict the user's destination.

Being able to predict a driver's destination plays a critical role in the ability to offer personal and contextual service to the user without a user's setup like navigation, e.g., relevant traffic along the route, parking at the destination, etc. The present invention provides a solution to the problems of conventional systems by combining offline learned user behavior from historical data and real-time online prediction from the live trip data. The system and method according to the present invention use the destination prediction from learned destination candidates, quality control by a confidence measure and prediction of the driving direction if the user drives to a completely new destination. The prediction can be learned from the live trip data as the context, but it requires the confidence measure to improve the prediction accuracy. An effective confidence measure can improve the accuracy of the predicted destination, reject the predicted destinations from all of the possible learned destination candidates, and if the user drives to a completely new destination, estimate more information about this destination for a given information, e.g., predict the direction of the destination, though the destination location may not be known.

The present invention aims to leverage personal driving history data, a user profile, and real-time live trip tracking as the context to predict the destination, particularly for a low complexity algorithm and smart onboard experience. The present invention proposes a novel algorithm to address a confidence measure, a rejection strategy, and self-learning to optimize the prediction performance learned from data rather than the user's explicit interaction.

Live trip prediction can be determined by multiple factors, including a user's driving behavior offline which is learned from historic driving data, a user's profile, and context data including live trip data. Conventional technology is only able to predict the driving destination among the destination candidate list that is learned from the trip data history of either frequently visited places and/or routes or collaborative destinations from crowdsourcing.

Although users drive mostly among frequent places (e.g., home, office, shopping, etc.), users sometimes drive to completely new places. In order to provide an accurate live trip prediction in real-time, the present invention uses a confidence measure to determine the quality of a predicted destination from the behavior-based destination candidates. If all of the confidences for each of the destination candidates are low, the system rejects the live trip prediction from the candidates and indicates that the user is driving to a completely new destination that has never been visited before. It would be very valuable to predict the destination in this case too.

The present invention proposes a very low-complexity live trip prediction algorithm for confidence measure, rejection strategy, and prediction of a completely new destination a given user has never visited before. It is especially critical to handle real-time processing in an embedded device while taking the cost and network into account to minimize the dependence on a route application programming interface (API). Users don't always set navigation, particularly when driving in a familiar area. To provide a user with a personalized, intelligent and contextual journey experience, it is highly desired for a machine learning approach to predict the user's next destination which can automatically detect a driver's intention without the driver's manual input, and notify the driver with real-time relevant information, such as traffic, incident alert, dynamic route update, gas station, points-of-interest (POI) or event recommendation and the like, during the live trip.

The present invention improves the user's driving experience by determining where users are going and which route they are choosing even when they are not going to a known destination, sends relevant notifications about congestion, road construction, lane closures, events and other relevant information to the user, and recommends relevant POIs to the user. In addition to providing an effective, low-complexity solution, including real-time live trip prediction from candidates, a confidence measure, a rejection strategy, and a destination estimation for completely new destinations, the present invention automatically learns all the time.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
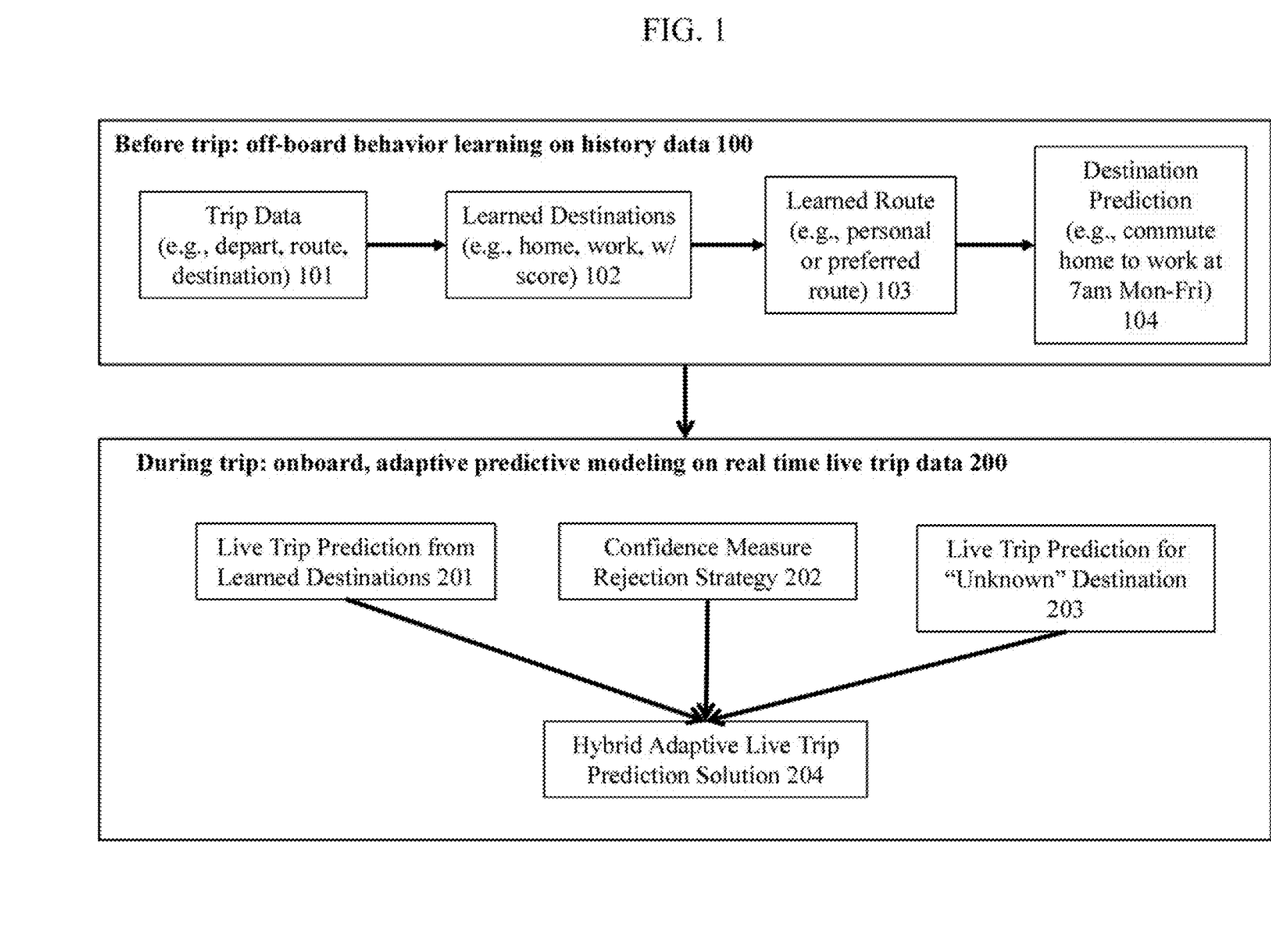
FIG. 1 illustrates a functional block diagram of a system according to an embodiment of the present invention.

FIG. 1 illustrates a functional block diagram of a system according to an embodiment of the present invention. As illustrated in FIG. 1, the system includes before-the-trip functions 100 and during-the-trip functions 200. Before the trip, the system collects trip data 101 (e.g., departure time and location, routes used, destinations) from trips previously taken by the driver. Learned destinations (e.g., home, work, stores, restaurants, etc.) with associated scores, which are learned from a driver's previous trips, are stored in function 102. The system also determines and stores learned routes that the driver has previously taken in function 103. Based on the trip data 101, learned destinations 102 and learned routes 103, the system can perform a destination prediction (e.g., commute from home to work at 7:00 AM Monday-Friday) before a trip. The system includes a memory that stores the trip data and other data, which can be any kind of non-transitory memory, such as random access memory (RAM), read-only memory (ROM), flash memory, a hard disk, a CD, a DVD, and cloud storage.

The during-the-trip functions 200 of FIG. 1 include performing a live trip prediction based on learned destinations 201, performing a confidence measure and rejection strategy on all possible candidate destinations 202, and performing a live prediction in real time for unknown (new) destinations 203. By combining all of these functions, the system according to the present invention provides a hybrid adaptive live trip prediction solution 204 that includes trip predictions for learned destinations and live, real-time trip predictions for unknown (new) destinations as further described below. The operations of the adaptive live trip prediction are performed by a processor adapted to perform these operations. The processor can be any type of processor, such as a field programmable gate array (FPGA), application specific integrated circuit (ASIC), central processing unit (CPU) and/or a microprocessor programmed to perform the functions of the adaptive live trip prediction.

Figure 2:
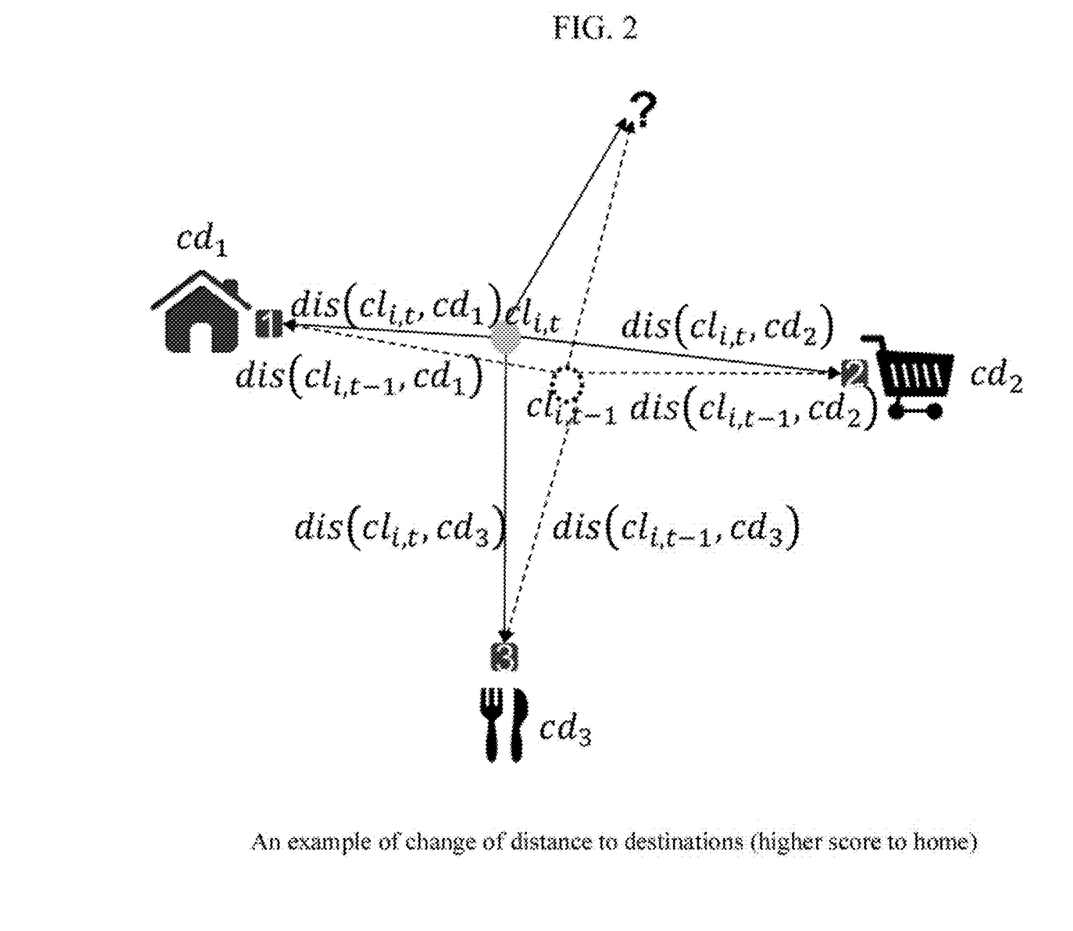
FIG. 2 illustrates an example of trip prediction from learned destinations including a change of distance to possible destinations in which a home destination has a highest likelihood score.

FIG. 2 illustrates an example of trip prediction from learned destinations including a change of distance to possible destinations in which a home destination has a highest likelihood score. Illustrated in FIG. 2 are three candidate destinations $cd_1$, $cd_2$, and $cd_3$ that are known from the learned destinations of the user (driver) from previous trips by the driver and an unknown (new) destination (?). At time $t-1$ the current location of driver i illustrated by the dashed circle was $cl_{i,t-1}$ and at time t the current location of the driver i illustrated by the solid dot is cli,t. The distance between the driver and candidate destination 1 ($cd_l$), for example, is shown as $dis(cl_{i,t}, cd_l)$. This feature, which illustrates the change in location over time, is based on the idea that the driver will more likely drive in the direction to the destination. The distance to the destination should keep decreasing with tolerance. Given the current location (cl) of user i at time t ($cl_{i,t}$, $t \in T$), the candidate destination k $cd_k$, counter cnt, a distance-based score function for each candidate destination is formulated as:

$$sDis(cd_k|cl_{i,t}) = f(sDis(cd_k|cl_{i,t-1}), \Delta dis(cl_{i,t-1} \to cl_{i,t}, cd_k))$$

$$\Delta dis(cl_{i,t-1} \to cl_{i,t}, cd_k) = dis(cl_{i,t-1}, cd_k) - dis(cl_{i,t}, cd_k)$$

The distance-based instant score at time t is defined as:

$$maxDis_t = max_t(\Delta dis(cl_{i,t-1} \to cl_{i,t}, cd_k))$$

$$sInsDis(cd_k|cl_{i,t}) = (\Delta dis(cl_{i,t-1} \to cl_{i,t}, cd_k))/(max_t(\Delta dis(cl_{i,t-1} \to cl_{i,t}, cd_k))), \text{ if } \Delta dis(cl_{i,t-1} \to cl_{i,t}, cd_k) > 0$$

A cumulative distance-based score then can be calculated as:

$$(cd_k|cl_{i,t}) = \lambda \times ((sDis(cd_k|cl_{i,t-1}) \times cn_{t-1} + sInsDis(cd_k|cl_{i,t}))/cn_t) + (1-\lambda) \times sInsDis(cd_k|cl_{i,t}).$$

These scores are used to determine the driver's likelihood of traveling to the various candidate destinations. As described below with reference to FIG. 5, the system and method according to the present invention are able to predict unknown (new) destinations in real-time during a trip. Conventional systems, however, are not able to make a live trip prediction of unknown (new) destinations.

Figure 3:
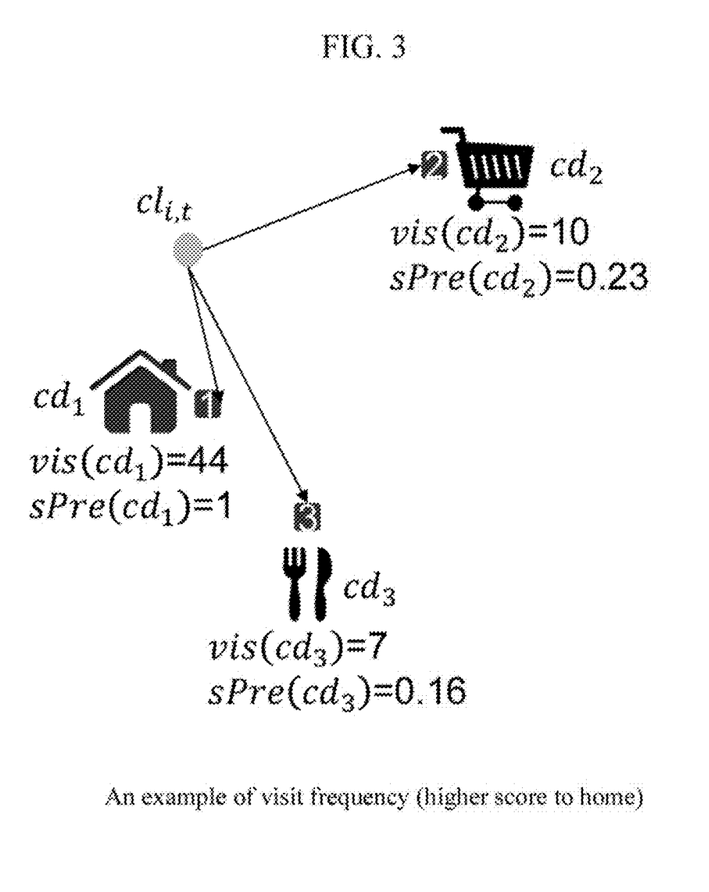
FIG. 3 illustrates an example of trip prediction from learned destinations using preference scores illustrating that a driver is more likely to go to places previously visited.

FIG. 3 illustrates an example of trip prediction from learned destinations using preference scores illustrating that a driver is more likely to go to places previously visited. The driver is more likely to go to the most commonly visited places in the driver's history. Accordingly, the frequency in the history can represent the likelihood that the driver will go to the destination. Given the driving history of driver i, a preference score for each candidate destination can be calculated based on the number of visits as follows:

$$sPre(cd_k) = \frac{vis(cd_k)}{max_k(vis(cd_k))}.$$

Here the maximum score for each destination is 1 and the minimum score for each destination is 0. As illustrated in FIG. 3, candidate destination 1 $cd_l$ (home) has been visited 44 times and has a preference score of 1, candidate destination 2 $cd_2$ (store) has been visited 10 times and has a preference score of 0.23, and candidate destination 3 $cd_3$ (restaurant) has been visited 7 times and has a preference score of 0.16. Thus, when the driver is located at the current location of $cl_{i,t}$, the driver is most likely to go to candidate destination 1 based on the learned destination information of the driver's driving history.

Figures 4A, 4B:
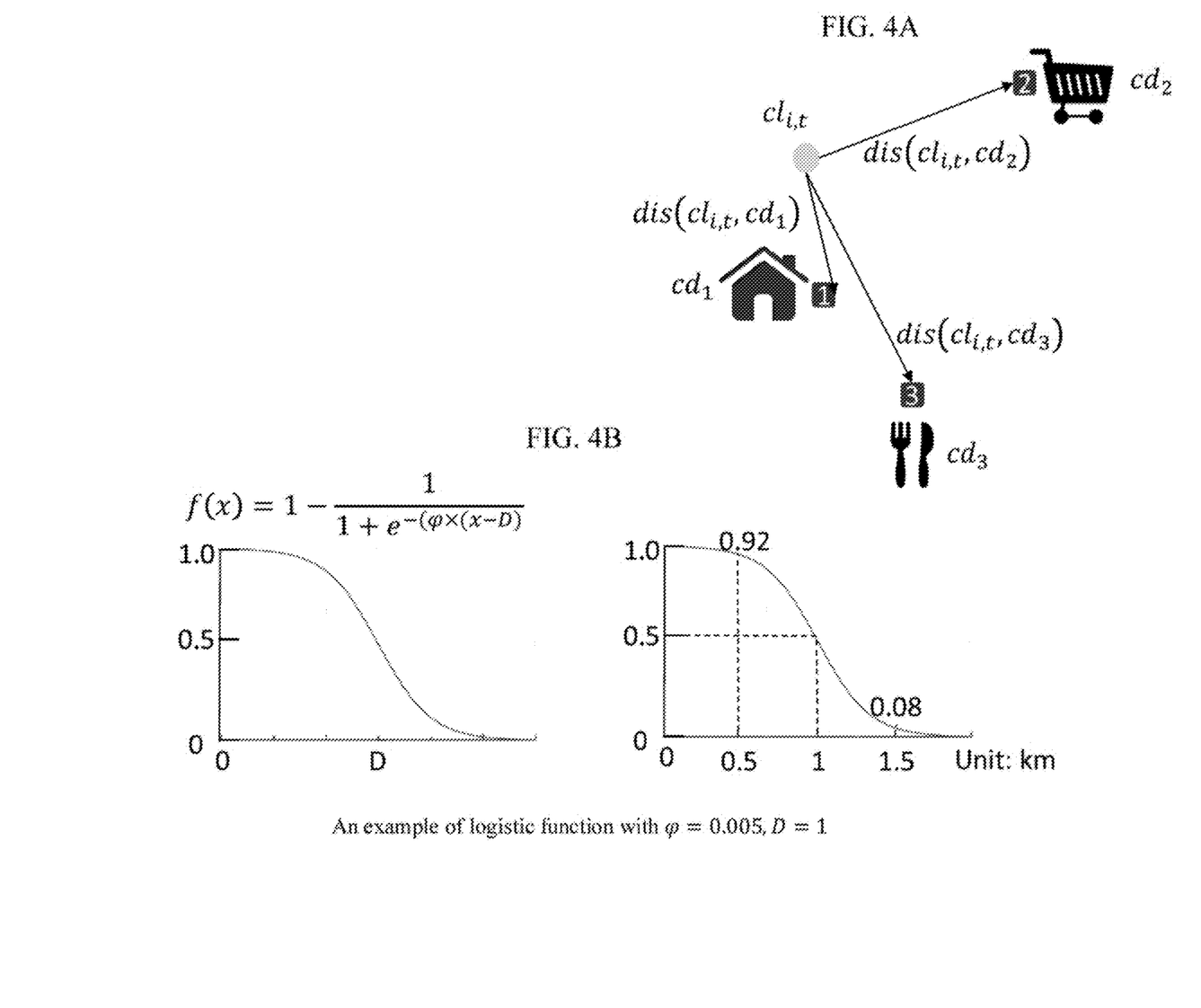
FIGS. 4A and 4B illustrate an example of live trip prediction from learned destinations using distance to candidate destinations and a corresponding logistic function.

FIGS. 4A and 4B illustrate an example of live trip prediction from learned destinations using distance to candidate destinations and a corresponding logistic function. If the driver is located very close to one candidate destination and two candidate destinations are in the same driving direction, the system should provide more predictable routes. Accordingly, the closest location should be considered as the destination first. If the driver passes the closest candidate destination, the system will adaptively adjust the weights to predict to which of the other candidate destinations the driver is most likely to go. Given the current location of driver i at time t, cl$_{i,t}$, the score representing the distance to the candidate destination is formulated as:

$$sDisToDes(cd_k \mid cl_{i,t}) = 1 - \frac{1}{1 + e^{-(\varphi \times (dis(cl_{i,t}, cd_k) - D))}}.$$

The combined score of each candidate destination is formulated as:

score(cd$_k$|cl$_{i,t}$)=α×sDis(cd$_k$|cl$_{i,t}$)+β×sDisToDes(cd$_k$|cl$_{i,t}$)+γ×sPre(cd$_k$), where α+β+γ=1. Here the logistic function is $$f(x) = 1 - \frac{1}{1 + e^{-(\varphi \times (x - D))}},$$

where φ=0.005 and D=1.

Although the present invention includes the foregoing predictive techniques for learned destinations from a driver's driving history, the present invention improves upon these techniques by providing a confidence measure and rejection strategy for live trip prediction of unknown (new) destinations.

Figure 5:
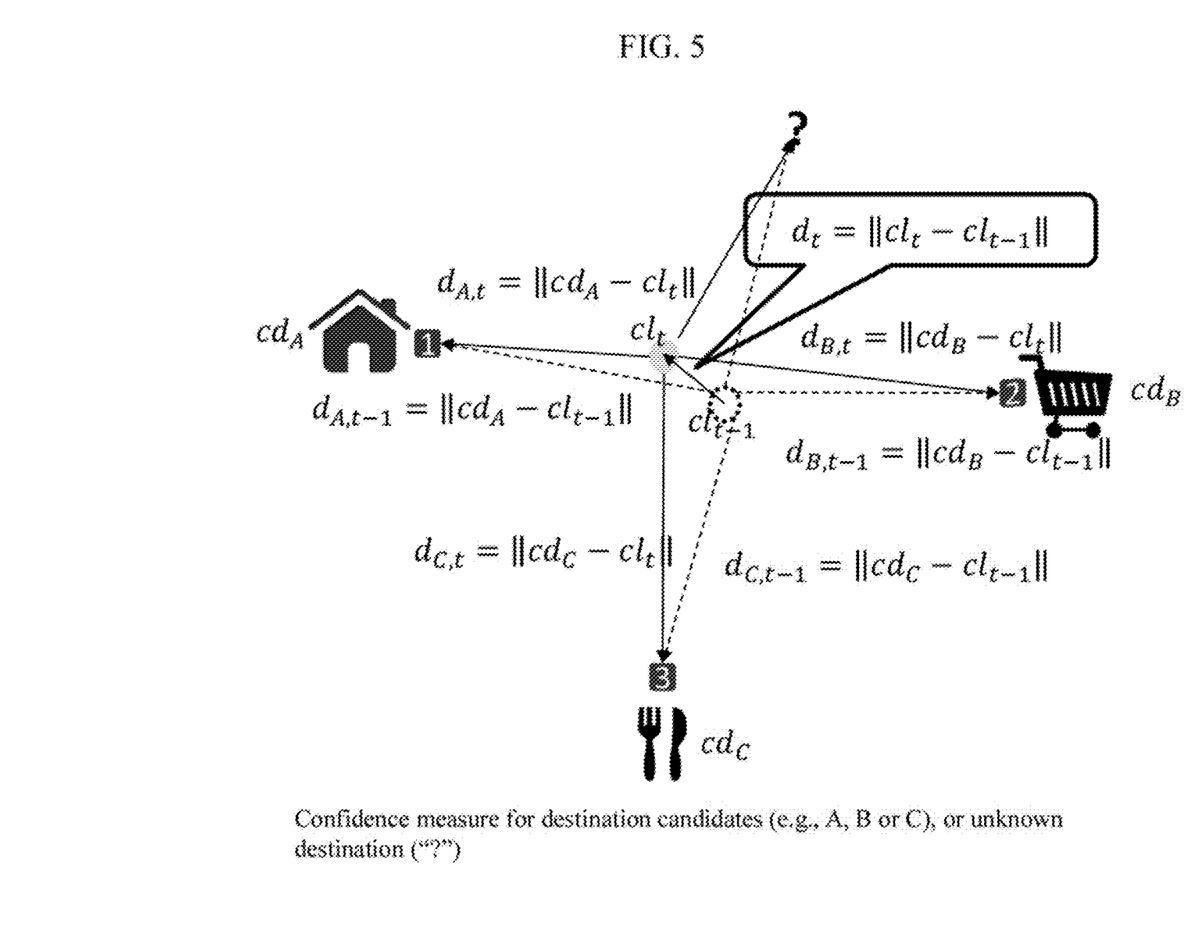
FIG. 5 illustrates a confidence measure and rejection strategy for live trip prediction among a plurality of candidate destinations.

FIG. 5 illustrates a confidence measure and rejection strategy for live trip prediction among a plurality of candidate destinations. The system and method according to the present invention determines a confidence level that the driver is traveling to a particular destination for each of the candidate destinations. Further, the system and method according to the present invention determine when a driver is driving to an unknown (new) destination that is not included in the candidate destinations in the driver's driving history.

In FIG. 5, three candidate destinations (cd$_1$, cd$_2$, and cd$_3$) known from the driver's driving history and an unknown (new) destination (?) are illustrated. The distance determinations between the current locations at time t−1 (cl$_{t-1}$) and time t (cl$_t$) and the three candidate destinations are illustrated in FIG. 5. The distance between cl$_{t-1}$ and cl$_t$ is d$_t$=∥cl$_t$−cl$_{t-1}$∥. The following equations are used to determine a change in distance between a driver's location at times t−1 and t relative to candidate destination A (cd$_A$):

$$D_t = \sum_{t=1}^{t} d_t$$

$$\Delta D_{A,t} = \begin{cases} d_{A,t-1} - d_{A,t}, & \text{if } d_{A,t-1} - d_{A,t} > 0 \\ 0, & \text{Otherwise} \end{cases}$$

$$D_{A,t} = \sum_{t=1}^{t} \Delta D_{A,t}.$$

Based on these distance determinations, a confidence measure at time t for candidate destination A (cd$_A$), for example, can be determined as $$CM_{A,t} = \frac{D_{A,t}}{D_t},$$

where 0≤CM$_{A,t}$≤1. In general, the lower the confidence measure, the less likely it is that the driver is heading to a known destination, but a threshold is used to make the determination of whether the driver is heading to an unknown (new) destination. To determine when the predicted destination is an unknown (new) destination instead of one of the known destinations from the driver's driving history data illustrated in FIG. 5, the method according to the present invention determines the following: IF:

$$\max_{i \in [A,B,C]} \{CM_{i,t}\} \leq \text{Threshold},$$

THEN: vehicle heading toward unknown (new) destination.

Figure 6:
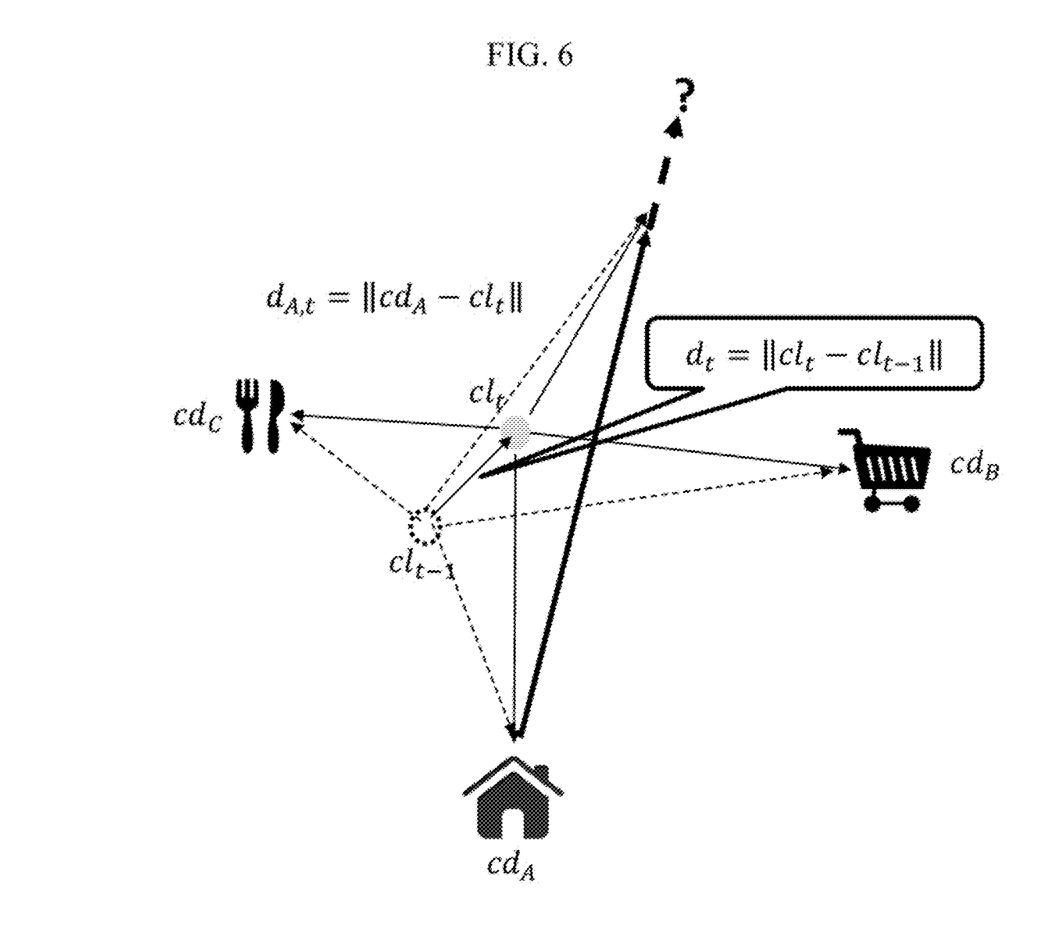
FIG. 6 illustrates an embodiment of the present invention in which live trip prediction is performed for an out-of-candidate destination.

FIG. 6 illustrates an embodiment of the present invention in which live trip prediction is performed for an out-of-candidate destination. In trip prediction it is generally assumed that drivers prefer to drive from one location to a destination either with the shortest route or the fastest route. If a driver drives from location cl$_0$ (i.e., A) to cl$_N$ (i.e., ?), we have the following tracking data: (cl$_0$, . . . , cl$_{t-1}$, cl$_t$, . . . cl$_N$). For each update, the driver moves as follows: (cl$_{t-1}$→cl$_t$), where the change in distance between cl$_{t-1}$ and cl$_t$, ΔD$_t$=∥cl$_t$−cl$_{t-1}$∥, D$_t$=∥cl$_t$−cl$_0$∥, and D$_{t-1}$=∥cl$_{t-1}$−cl$_0$∥. Setting θ$_t$ as the angle between cl$_0$→cl$_t$ and a north (or other predetermined) direction assuming a shortest route, then a fitting function for the unknown (new) destination is estimated as follows:

$$\theta_t = \frac{2}{1 + e^{\alpha \cdot D_t + \beta}} + \hat{\theta} + \varepsilon,$$

where $\hat{\theta}$ is the estimated driving direction at time t in real time. Thus, the unknown (new) destination can be determined based on the fitting function as further described below. Based on this determination, the system according to the present invention recommends points-of-interest (POIs) along the determined direction of the trip.

The inventors of the present invention tested the above-described live trip prediction for an unknown (new) destination as follows. In a case in which there are four learned destinations (A, B, C, and D), destination A can be assumed to be an unknown (new) destination to use the trip data from a starting point of the trip toward destination A and, at each time stamp (t$_0$, t$_1$, . . . , t$_T$), the locations heading to destination A are used to test a heading angle. The angle from destination A to the starting point is easily computed and denoted as θ$_{A_tT}$, since locations for the starting point and destination A are already known. From every measured location and the starting point, a sequence of angles, θ$_{A_t1}$, θ$_{A_t2}$, . . . is computed, and then the sequence θ$_{A_t1}$, θ$_{A_t2}$ . . . was tested to see that it converges to θ$_{A_tT}$. The formula for testing the convergence is $$\|\theta_{A_{ti}} - \theta_{A_tT}\| \leq \frac{\varepsilon}{D_{A_{ti}}},$$

where on the right side the tolerance is divided by the total driving distance D$_{A_tT}$ because the farther the driver drives, the closer the angle goes to the real angle.

Figure 7A:
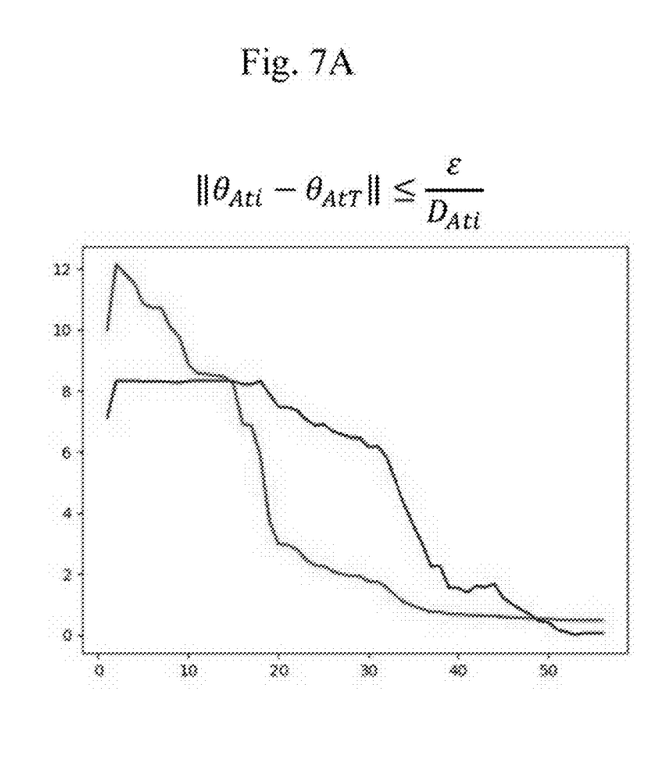
FIGS. 7A and 7B illustrate diagrams of test results showing a difference between an estimated angle and the true angle versus total driving length.
Figure 7B:
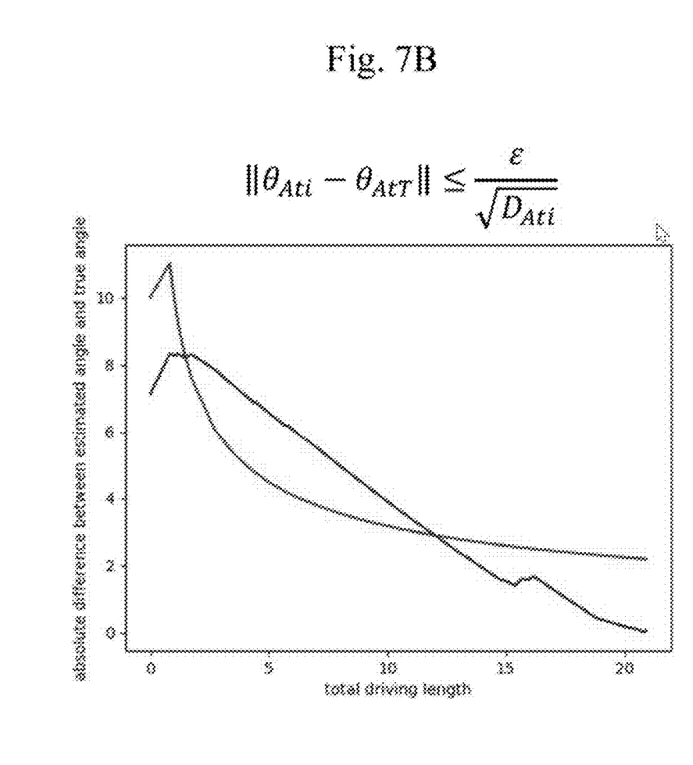

FIGS. 7A and 7B illustrate diagrams of test results showing a difference between an estimated angle and the true angle versus total driving length. In particular, FIG. 7A illustrates the difference between the estimated angle and the true angle versus the total driving length, while FIG. 7B illustrates the difference between the estimated angle and the true angle versus the square root of total driving length. As illustrated in FIGS. 7A and 7B, the farther the driver drives, the smaller the difference between the angles becomes.

Figure 8:
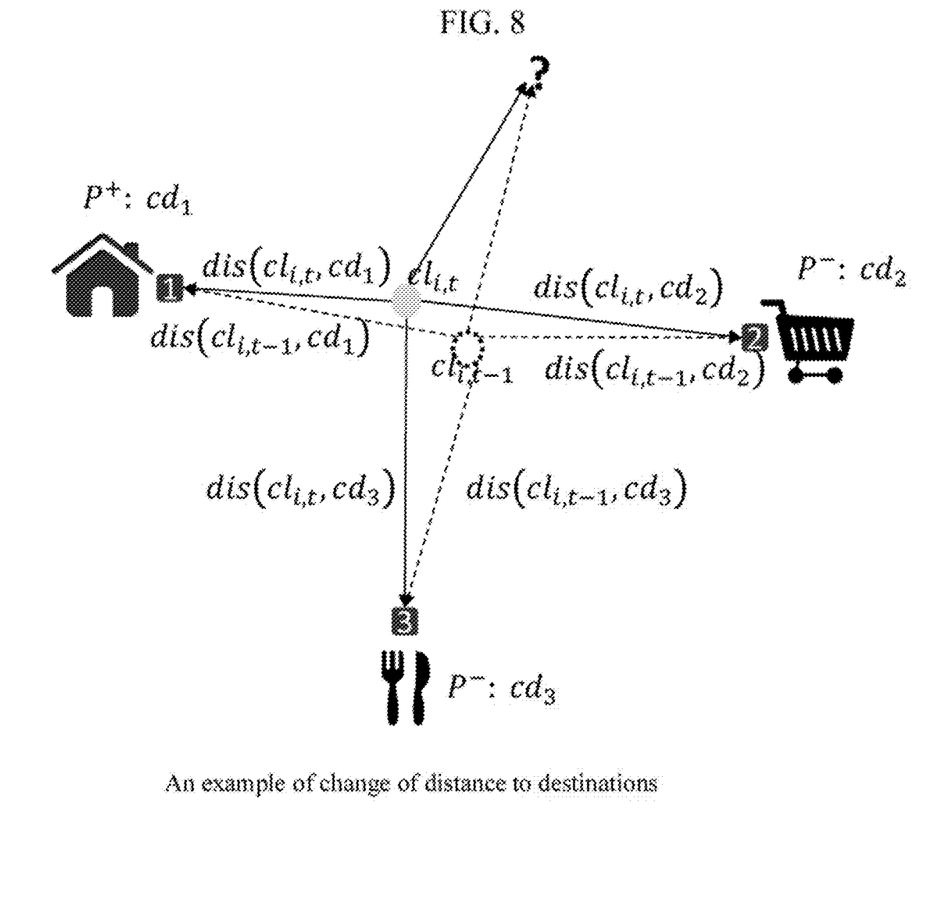
FIG. 8 illustrates an embodiment of personal parameter adaptation for a live trip prediction as the distance to the destination changes.

FIG. 8 illustrates an embodiment of personal parameter adaptation for a live trip prediction as the distance to the destination changes. An objective function related to the personal parameter adaptation has the following equation:

$$F = \sum_{i=Trip_1}^{I=Trip_I} \frac{1}{\sqrt{\|Trip_i\|}} \sum_{t=i,cl_1}^{T=i,cl_T} \sum_{k=i,t,cd_1}^{K=i,t,cd_K} f(P_{i,t,k}^+ - P_{i,t,k}^-).$$

An activation function related to the objective function is $$f(x) = \frac{1-e^{-\mu x}}{1+e^{-\mu x}}$$

and the scoring function for scoring the candidate destinations and the unknown (new) destination is: score($cd_k|cl_{i,t}$)=α×sDis($cd_k|cl_{i,t}$)+β×sDisToDes($cd_k|cl_{i,t}$)+γ×sPre($cd_k$).

The parameter adaptation for the destination is represented as $$p \leftarrow p - lr \cdot \frac{\partial F}{\partial p},$$

wherein lr denotes the learning rate, e.g., 0.01, and p∈ {α, β, γ}. The scoring function may also be represented as follows:
$P_{i,t,k}^+$=score($cd_k|cl_{i,t}$), True destination for $i^{th}$ trip, $k^{th}$ destination and at location of time t.
$P_{i,t,k}^-$=score($cd_k|cl_{i,t}$), Others.

Figure 9A:
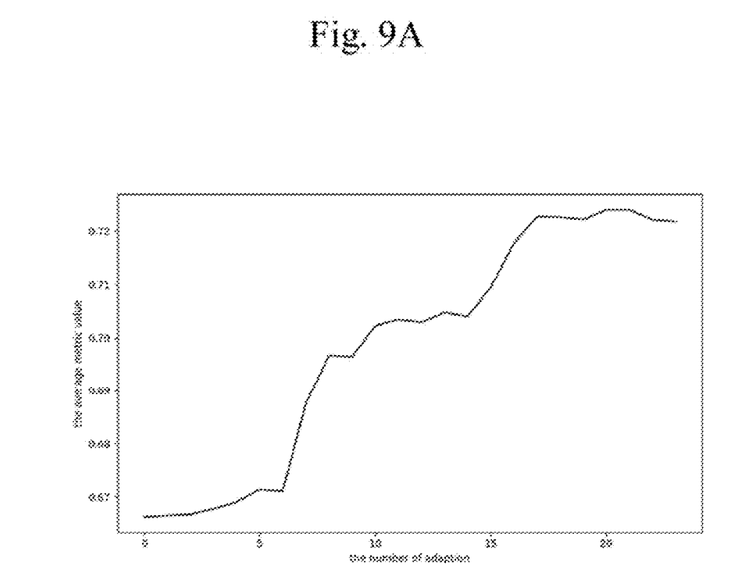
FIGS. 9A and 9B illustrate experimental results of average metric value versus number of adaptations and variance metric value versus number of adaptations, respectively, for adaptive live trip prediction.
Figure 9B:
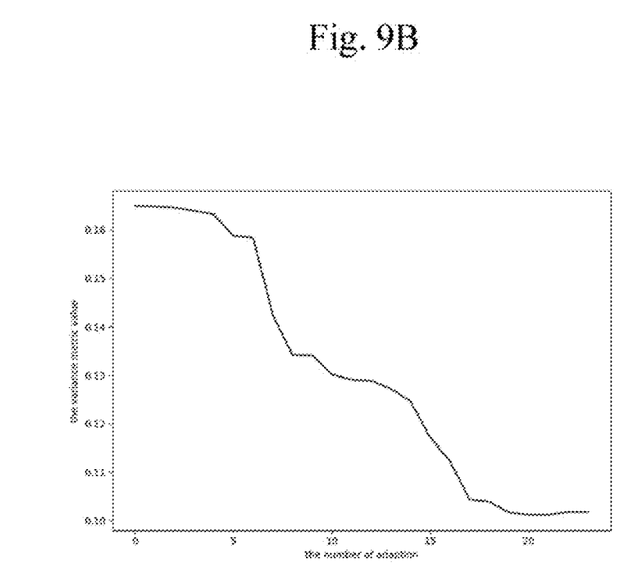

FIGS. 9A and 9B illustrate experimental results of average metric value versus number of adaptations and variance metric value versus number of adaptations, respectively, for adaptive live trip prediction. The inventors performed experiments to test the performance of adaptive live trip prediction. The evaluation metric is defined to detect when the correct predicted destination is generated. The definition of metric is the ratio between the remaining driving distance or duration when correct predicted destination and the total trip distance or duration. When the trip distance is 100 miles, the correct destination is first predicted after driving 20 miles. Here, the predictability metric=(100−20)/100=80%.

The greater the metric is, the earlier the correct destination will be predicted. For example, for a metric of 1, this means that the correct destination is predicted when the driver just starts the trip. If the metric is 0, this means that the correct destination is not predicted until the user arrives at the final destination. The experiment included data from 67 real life trips. Thus, the objective function is applied on the data from 67 trips. Then the model adaptation is applied for training the weight parameters. For each iteration of the model adaptation, an evaluation metric is estimated among all the trips. Then the mean and variance among the metrics from all of the trips were estimated.

In particular, FIG. 9A illustrates that as the number of adaptive iterations increases, the overall predictability metric increases as well. The optimal performance (93%) is reached at the iteration of 23. For example, this represents correctly predicting the destination after 7 miles of a 100 mile trip. FIG. 9B illustrates that as the number of adaptive iterations increases, the variance for metrics decreases. This means that the predictive model is getting stable and balanced along all the trips. The overall metric is represented by the following equation:

$$\text{Overall Metric} = \frac{\sum_{i=Trip_1}^{I=Trip_I}(\text{Metric}(Trip_i))}{I},$$

where I is the number of iterations.

Figure 10A:
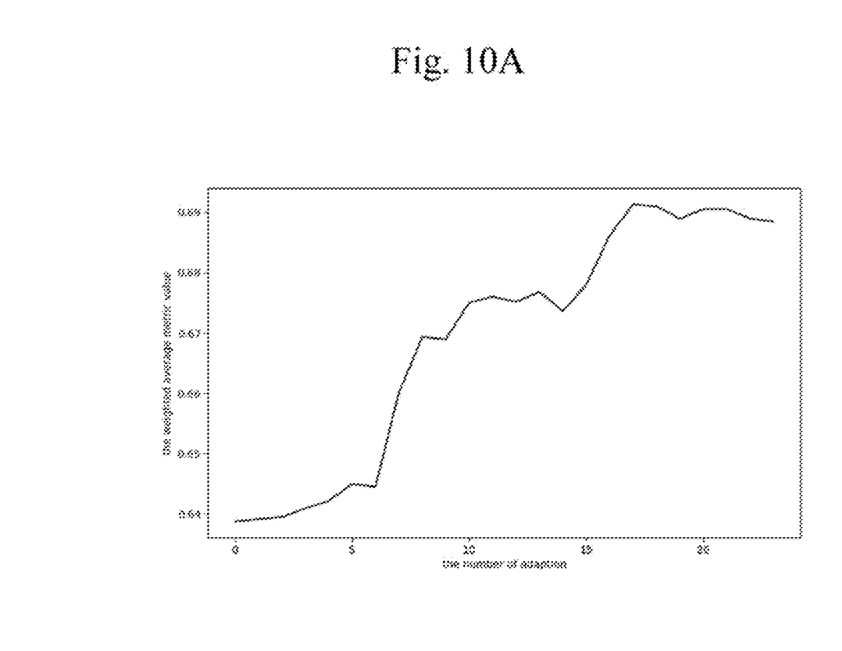
FIGS. 10A and 10B illustrate experimental results of weighted average metric value versus number of adaptations and weighted variance metric value versus number of adaptations, respectively, for adaptive live trip prediction.
Figure 10B:
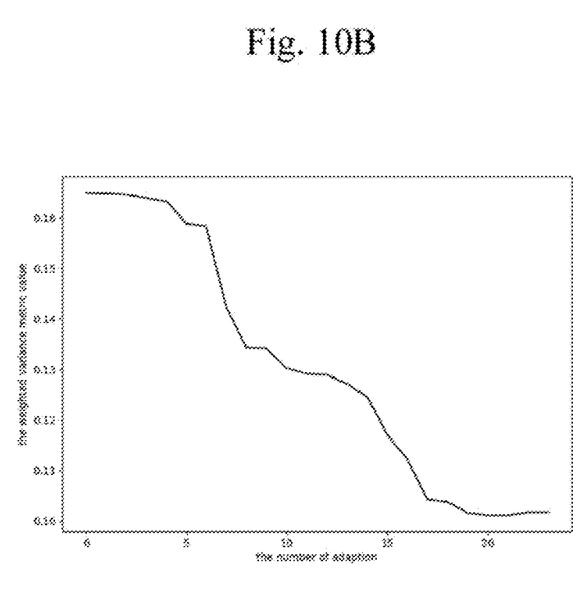

FIGS. 10A and 10B illustrate experimental results of weighted average metric value versus number of adaptations and weighted variance metric value versus number of adaptations. The weighted metrics are used to balance the contribution between long and short trips. In this way, the average value can maintain the balance of affect between a long distance trip and a short distance trip. The weighted overall metric is represented by the following equation:

$$\text{Weighted Overall Metric} = \frac{\sum_{i=Trip_1}^{I=Trip_I}\sqrt{\|Trip_i\|} \cdot (\text{Metric}(Trip_i))}{\sum_{i=Trip_1}^{I=Trip_I}\sqrt{\|Trip_i\|}}.$$

From FIGS. 10A and 10B, the same conclusion can be drawn as FIGS. 9A and 9B, i.e., the optimal model makes prediction accurately, early and stably.

Figure 11:
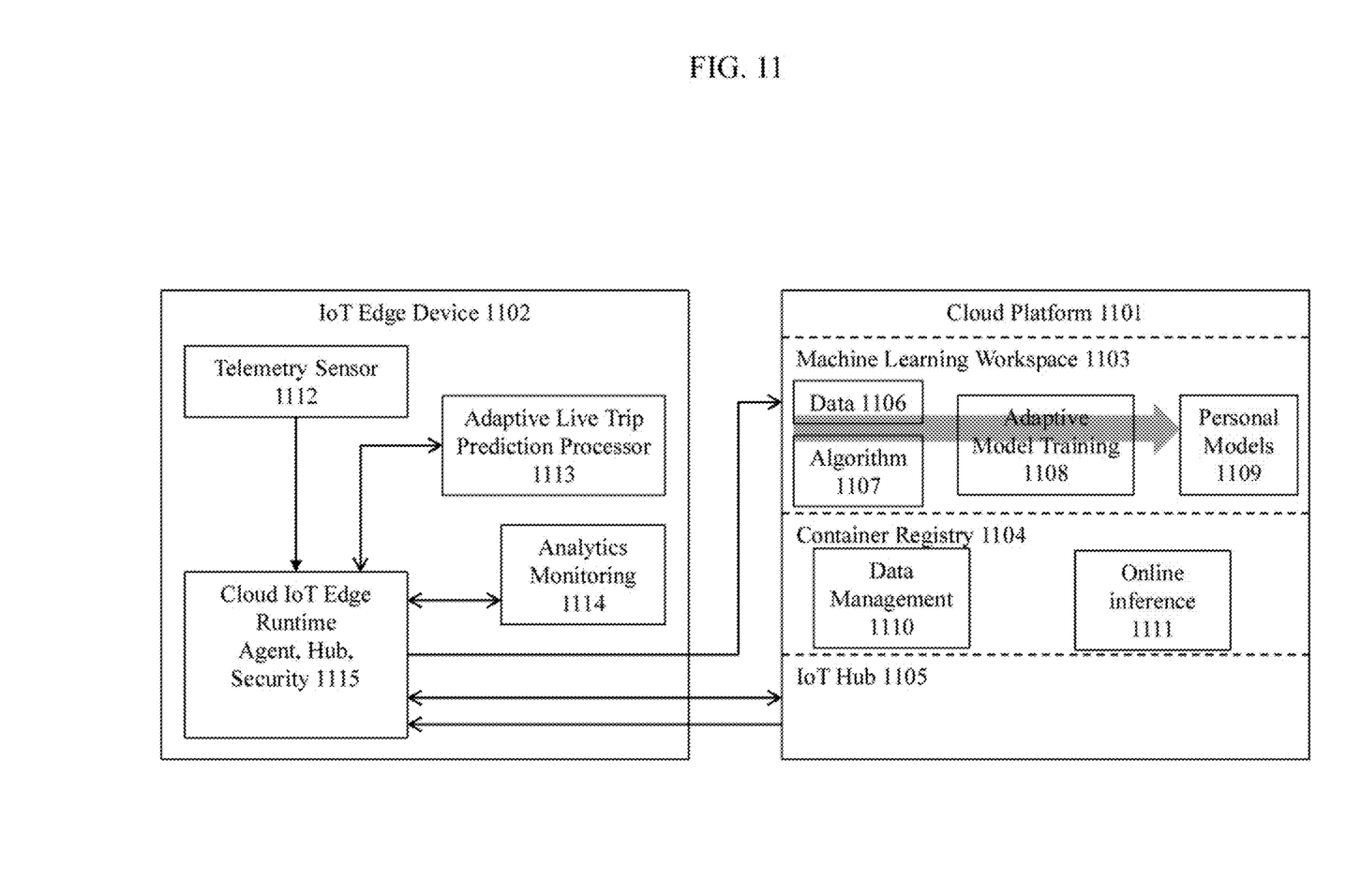
FIG. 11 illustrates an example of a system in which the adaptive live trip prediction is performed.

FIG. 11 illustrates an exemplary embodiment of a system block diagram for a system in which the adaptive live trip prediction is performed as described above. The system 1100 illustrated in FIG. 11 includes, for example, a cloud computing platform 1101 and an internet-of-things (IoT) edge device 1102. The cloud computing platform 1101 includes, for example, a machine learning workspace 1103, container registry 1104, and an IoT Hub 1105. The machine learning workspace 1103 includes, for example, data 1106, algorithm 1107, adaptive model training 1108, and personal models 1109. The container registry 1104 includes, for example, data management 1101 and online inference 1111. As illustrated in FIG. 11, the IoT edge device 1102 includes, for example, the following modules: a telemetry sensor module 1112, an adaptive live trip prediction processor module 1113, an analytics monitoring function module 1114, and a cloud IoT edge runtime agent, hub, and security module 1115, which communicate with each other as illustrated by the communication lines between the modules. The IoT edge device 1102 can be, for example, a vehicle head unit driven by IoT and empowered by a machine learning model. As illustrated in FIG. 11, data is transmitted between the cloud computing platform 1101 and the IoT edge device 1102 to facilitate the above-described adaptive live trip prediction in real time for the driver of a vehicle. Between IoT edge device 1102 and the cloud platform 1101, there are, for example, three connections, including telemetry, monitoring from edge device to cloud and model update pushed from the cloud into the IoT edge device 1102.

Figure 12:
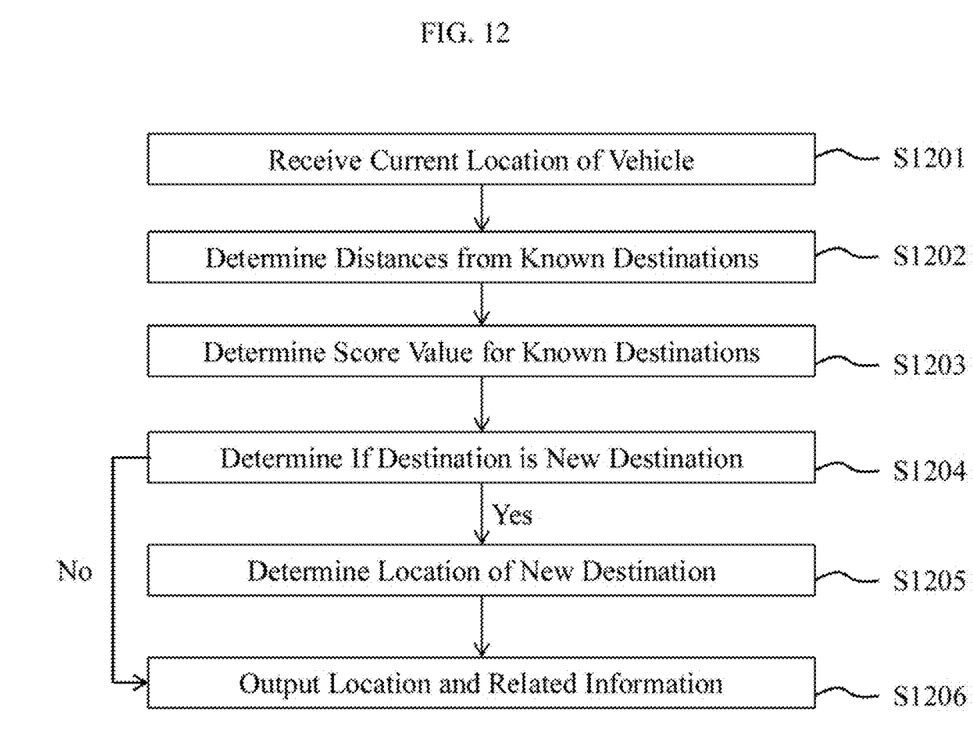
FIG. 12 illustrates an exemplary embodiment of a method according to the present invention.

FIG. 12 illustrates an exemplary embodiment of a method according to the present invention. In step S1201, the system receives current location information about the vehicle in which the user is driving. Based on the current location information, in step S1202 the method determines distances between the vehicle and a plurality of known destinations that are stored in memory from previous trips made by the user. The method then determines in step S1203 a score value, as described above, for each of the known destinations based on the distance of the vehicle from each of the known destinations at a first time, based on a previous distance of the vehicle from each of the known destinations at a previous time, and based on a predetermined weighting of each of the known destinations that is based on visit frequency of how often or how many times the user has visited the known destinations. In step S1204, the method determines if the destination of the vehicle is a new destination based on the score values. When the destination is not a new destination, but a known destination, the method proceeds to step S1206 and outputs location information and other information related to the destination and/or a route to the destination, such as POIs along the route and/or near the destination. On the other hand, if the destination is not one of the known destinations and is a new destination, the method determines the location of the new destination in step S1205. As described above, this determination can be made based on changes in a heading angle of the vehicle over time. Then, in step S1206, the method outputs location information and other information related to the destination and/or a route to the destination.

In another exemplary embodiment of the present invention, a non-transitory computer-readable medium is encoded with a computer program that performs the above-described method. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, or any other medium from which a computer can read.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for adaptive live trip prediction of a destination of a vehicle comprising:
   receiving current location information of the vehicle at a first time;
   determining a distance of the vehicle from each of a plurality of known destinations at which the vehicle has been previously, located based on patterns learned from stored trip data of the vehicle;
   determining a score value for each of the known destinations based on the distance of the vehicle from each of the known destinations at the first time, based on a previous distance of the vehicle from each of the known destinations at a previous time, and based on a predetermined weighting of each of the known destinations that is based on visit frequency;
   determining a confidence measure for each of the known destinations, indicating a likelihood of each of the known destinations being the destination of the vehicle, based on a change in distance between the vehicle and each of the known destinations;
   determining whether the destination is a new destination to which the vehicle has not previously gone based on the score values and the confidence measures, including determining whether each of the confidence measures is below a predetermined threshold, and determining that the vehicle is heading to the new destination based on all of the confidence measures being below the predetermined threshold;
   when it is determined that the vehicle is heading to the new destination, determining a location of the new destination based on an estimated fitting function that is determined based on changes in a heading angle of the vehicle at a plurality of measurement points over time including determining whether the heading angle converges to a predetermined value;
   outputting location information of the new destination to a vehicle control system of the vehicle; and
   optimizing switching between a combustion engine and an electric engine in the vehicle based on the location information of the new destination.

2. The method according to claim 1, wherein the stored trip data includes previous location information of the vehicle at previous times.

3. The method according to claim 1, further comprising outputting to the user interface at least one of information related to the location of the new destination and information related to a route to the new destination.

4. The method according to claim 1, further comprising outputting the location of the new destination to a user interface in the vehicle.

5. The method according to claim 4, further comprising outputting to the user interface at least one of information related to the location of the new destination and information related to a route to the new destination.

6. The method according to claim 1, further comprising:
   in a case in which the vehicle is a hybrid vehicle, optimizing switching between a combustion engine and an electric engine in the hybrid vehicle based on the location information of the new destination.

7. A non-transitory computer-readable medium storing a program for adaptive live trip prediction of a destination of a vehicle, which, when executed on a computer, causes the computer to:
   receive current location information of the vehicle at a first time;
   determine a distance of the vehicle from each of a plurality of known destinations at which the vehicle has been previously located based on stored trip data of the vehicle;
   determine a score value for each of the known destinations based on the distance of the vehicle from each of the known destinations at the first time, based on a previous distance of the vehicle from each of the known destinations at a previous time, and based on a predetermined weighting of each of the known destinations that is based on visit frequency;
   determine a confidence measure for each of the known destinations, indicating a likelihood of each of the known destinations being the destination of the vehicle, based on a change in distance between the vehicle and each of the known destinations;
   determine whether the destination is a new destination to which the vehicle has not previously gone based on the score values and the confidence measures, including determining whether each of the confidence measures is below a predetermined threshold, and determining that the vehicle is heading to the new destination based on all of the confidence measures being below the predetermined threshold;
   when it is determined that the vehicle is heading to the new destination, determine a location of the new destination based on an estimated fitting function that is determined based on changes in a heading angle of the vehicle at a plurality of measurement points over time including determining whether the heading angle converges to a predetermined value;

output location information of the new destination to a Vehicle control system of the vehicle; and optimize switching between a combustion engine and an electric engine in the vehicle based on the location information of the new destination.

8. The non-transitory computer-readable medium according to claim 7, wherein the stored trip data includes previous location information of the vehicle at previous times.

9. The non-transitory computer-readable medium according to claim 7, wherein the program further causes the computer to output to the user interface at least one of information related to the location of the new destination and information related to a route to the new destination.

10. The non-transitory computer-readable medium according to claim 7, wherein the program further causes the computer to output the location of the new destination to a user interface in the vehicle.

11. The non-transitory computer-readable medium according to claim 10, wherein the program further causes the computer to output to the user interface at least one of information related to the location of the new destination and information related to a route to the new destination.

12. The non-transitory computer-readable medium according to claim 7, wherein the program further causes the computer, in a case in which the vehicle is a hybrid vehicle, to optimize switching between a combustion engine and an electric engine in the hybrid vehicle based on the location information of the new destination.

* * * * *